United States Patent
Juan et al.

(10) Patent No.: US 8,487,890 B2
(45) Date of Patent: Jul. 16, 2013

(54) IN-CELL TOUCH-SENSITIVE PANEL

(75) Inventors: Yi Chung Juan, Yongkang (TW); Chia Hua Yu, Banciao (TW); Sung Chun Lin, Tainan (TW); Hsu Ho Wu, Tainan (TW)

(73) Assignee: Hannstar Display Corp, Taipei County (TW)

( * ) Notice: Subject to any disclaimer, the term of this patent is extended or adjusted under 35 U.S.C. 154(b) by 826 days.

(21) Appl. No.: 12/705,232

(22) Filed: Feb. 12, 2010

(65) Prior Publication Data
US 2010/0207902 A1 Aug. 19, 2010

(30) Foreign Application Priority Data
Feb. 13, 2009 (TW) .............................. 98104590 A

(51) Int. Cl.
*G06F 3/041* (2006.01)
(52) U.S. Cl.
USPC .......................................... 345/173; 345/156
(58) Field of Classification Search
USPC ............ 345/156, 173–179; 178/18.01–18.07, 178/19.01–19.05
See application file for complete search history.

(56) References Cited

U.S. PATENT DOCUMENTS

| 2003/0179323 | A1* | 9/2003 | Abileah et al. .................. 349/24 |
| 2006/0125971 | A1* | 6/2006 | Abileah et al. .................. 349/42 |
| 2008/0117182 | A1 | 5/2008 | Um et al. |
| 2008/0122800 | A1 | 5/2008 | Meng |
| 2009/0109359 | A1* | 4/2009 | Shih et al. ........................ 349/38 |
| 2010/0013796 | A1* | 1/2010 | Abileah et al. ................ 345/175 |
| 2010/0020044 | A1* | 1/2010 | Abileah et al. ................ 345/175 |
| 2010/0059296 | A9* | 3/2010 | Abileah et al. ............. 178/18.09 |

* cited by examiner

*Primary Examiner* — Ricardo L Osorio
(74) *Attorney, Agent, or Firm* — Lowe Hauptman Ham & Berner, LLP

(57) ABSTRACT

An in-cell touch-sensitive panel includes TFT and CF substrates. The TFT substrate includes a net-shaped readout circuit and conductive pads arranged in array manner. The net-shaped readout circuit includes widthwise and lengthwise readout lines. The widthwise readout lines are electrically connected to the lengthwise readout lines. The conductive pads are electrically connected to the net-shaped readout circuit. Spacers are adapted to keep a first gap between the TFT and CF substrates. Protrudent portions are arranged to be corresponding to the conductive pads, and there is a second gap between the protrudent portion and the conductive pad. A transparent electrode covers the spacers and the protrudent portion.

19 Claims, 13 Drawing Sheets

IN-CELL TOUCH-SENSITIVE PANEL

CROSS REFERENCE TO RELATED APPLICATION

This application claims the priority benefit of Taiwan Patent Application Serial Number 098104590, filed on Feb. 13, 2009, the full disclosure of which is incorporated herein by reference.

TECHNICAL FIELD

The invention is related to a method for calculating a coordinate of a touch position of a touch-sensitive LCD panel, and more particularly to a touch-sensitive LCD panel, wherein the relative circuit of the touch-sensitive functions is designed in the touch-sensitive LCD panel.

BACKGROUND

It is important to apply touch-sensitive technology to a liquid crystal display (LCD) panel. Recently, a touch-sensitive panel (e.g. resistance type, capacity type, infrared ray type or surface acoustic wave type touch-sensitive panel) is generally extra attached on the LCD panel to order to realize touch-sensitive function. Referring to FIG. 1, a resistance type touch-sensitive panel 50 is widely applied to various terminal products because of simple manufacture processes and low cost. According to the resistance type touch-sensitive panel 50, the touch position can be certainly determined by using a plurality of conductive lines (e.g. four or five conductive lines), measuring a variation in voltage of conductive lines, and calculating the touch position. However, the extra attached touch-sensitive panel will result in the optical loss and relative characteristic loss of the LCD panel.

In order to solve the above-mentioned problem, an in-cell touch-sensitive panel is developed recently. In other words, relative circuit of the touch-sensitive functions is designed in the LCD panel. When the touch-sensitive LCD panel is manufactured, the circuit of the touch-sensitive function can be finished simultaneously. Such touch-sensitive LCD panel has no optical loss, but has touch-sensitive function.

For example, referring to FIG. 2, U.S. Patent Publication Number 2008/0122800 A1, entitled "Touch-sensitive Liquid Crystal Display Panel With Built-in Touch Mechanism And Method For Driving Same," discloses that a touch-sensitive liquid crystal display (LCD) panel 10 includes a first substrate 20, a second substrate 30 and a liquid crystal (LC) layer 40. The second substrate 30 is opposite to the first substrate 20. The liquid crystal layer 40 is disposed between the first substrate 20 and the second substrate 30. An electrode layer 24 is formed on the first substrate 20, and includes a plurality of scan and data lines. The scan and data lines cross each other, thereby defining a plurality of pixel regions. A plurality of conductive pads 22 are arranged to be corresponding to and electrically connected to the scan lines of the electrode layer 24. A conductive layer 32 is disposed between the second substrate 30 and the LC layer 40. A plurality of conductive protrusions 34 are located on the conductive layer 32, and there is a predetermined gap between each of the conductive protrusions 34 and a corresponding conductive pad 22.

The first substrate 20 belongs to a thin film transistor (TFT) substrate 12 which utilizes the scan lines to calculate a coordinate of touch position. However, scan signals of the scan lines are possibly disturbed accordingly. Furthermore, the second substrate 30 belongs to a color filter (CF) substrate 14 which already includes a transparent electrode 38. However, the conductive layer 32 and a flat insulating layer 36 must be extra added so as to increase manufacture cost and time. In addition, a plurality of spacers 42 are adapted to keep a predetermined gap between the TFT substrate 12 and the CF substrate 14 for accommodating the LC layer 40. However, the spacers 42 and the conductive protrusions 34 must be finished by different manufacture processes so as to also increase manufacture time.

Accordingly, there exists a need for a touch-sensitive LCD panel capable of solving the above-mentioned problems.

SUMMARY

The present invention provides an in-cell touch-sensitive panel includes TFT and CF substrates. The TFT substrate includes a net-shaped readout circuit and a plurality of conductive pads arranged in array manner. The net-shaped readout circuit includes a plurality of widthwise and lengthwise readout lines, wherein the widthwise readout lines are electrically connected to the lengthwise readout lines. The conductive pads are electrically connected to the net-shaped readout circuit. The CF substrate includes a plurality of spacers, a plurality of protrudent portions and a transparent electrode. The spacers are adapted to keep a first gap between the TFT and CF substrates. The protrudent portions are arranged to be corresponding to the conductive pads, and there is a second gap between the protrudent portion and the conductive pad. The transparent electrode covers the spacers and the protrudent portions.

The relative circuit of the touch-sensitive functions is designed in the touch-sensitive LCD panel of the present invention. When the touch-sensitive LCD panel is manufactured, the circuit of the touch-sensitive function can be finished simultaneously. The touch-sensitive LCD panel of the present invention has no optical loss, but has touch-sensitive function. Furthermore, it is not necessary to extra add a conventional conductive layer and a conventional flat insulating layer so as not to increase manufacture cost and time. In addition, the spacers and the protrudent portions can be made by the same material and by the same manufacture processes so as not to also increase manufacture time.

The foregoing, as well as additional objects, features and advantages of the invention will be more apparent from the following detailed description, which proceeds with reference to the accompanying drawings.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 1:
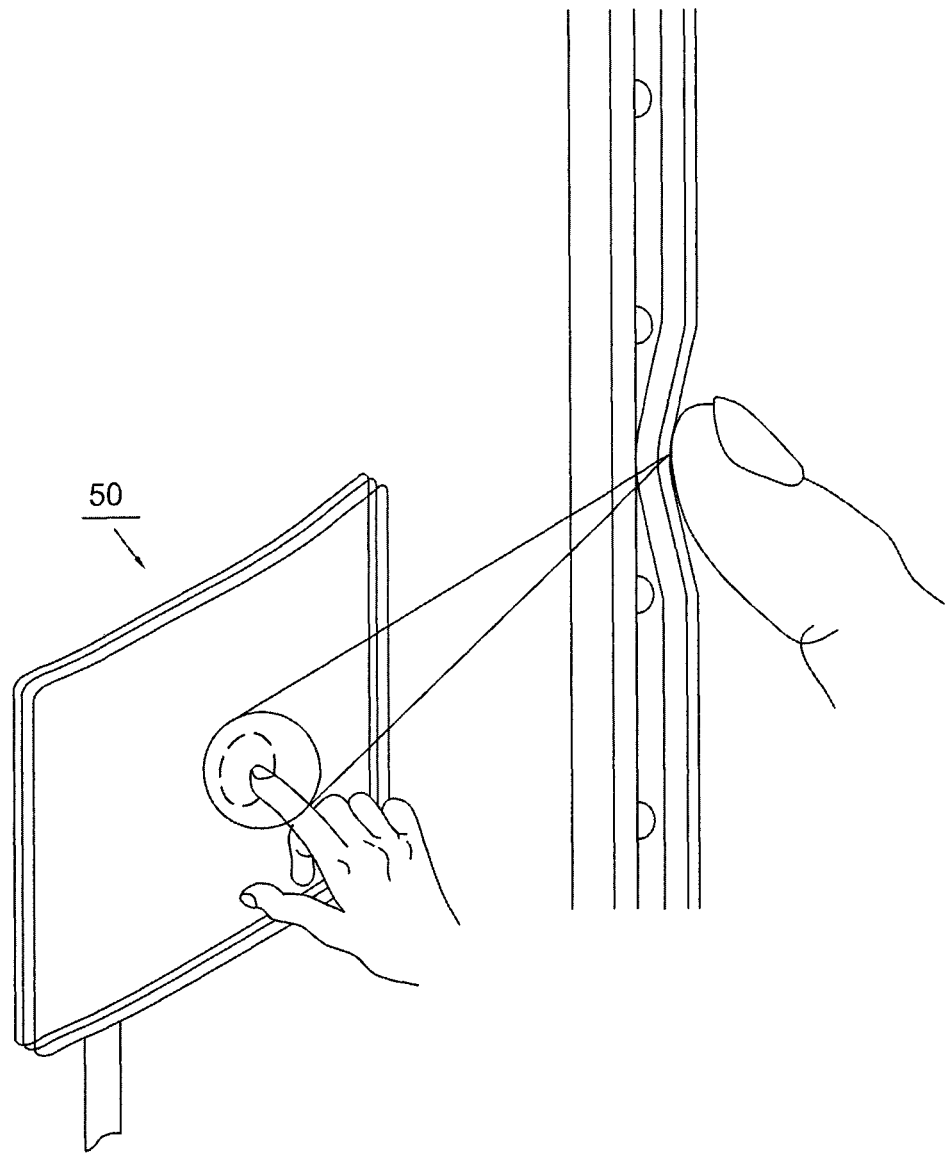
FIG. 1 is perspective and enlarged cross-sectional views of a resistance type touch-sensitive panel in the prior art.
Figure 2:
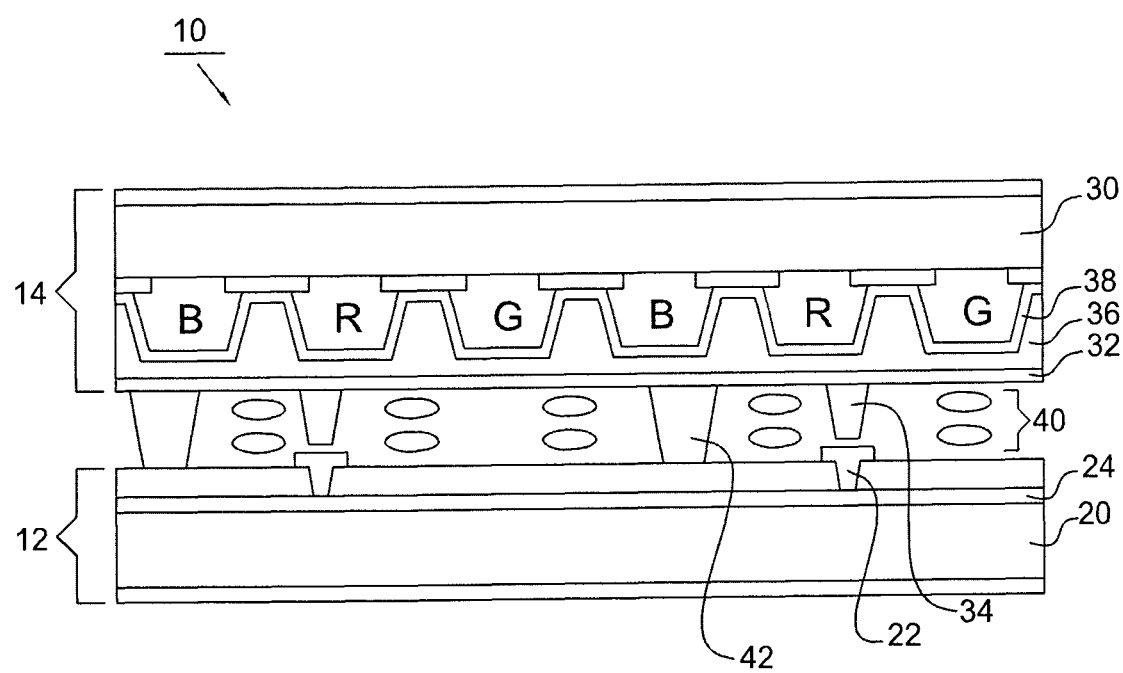
FIG. 2 is a cross-sectional view of a touch-sensitive LCD panel in the prior art.
Figure 3:
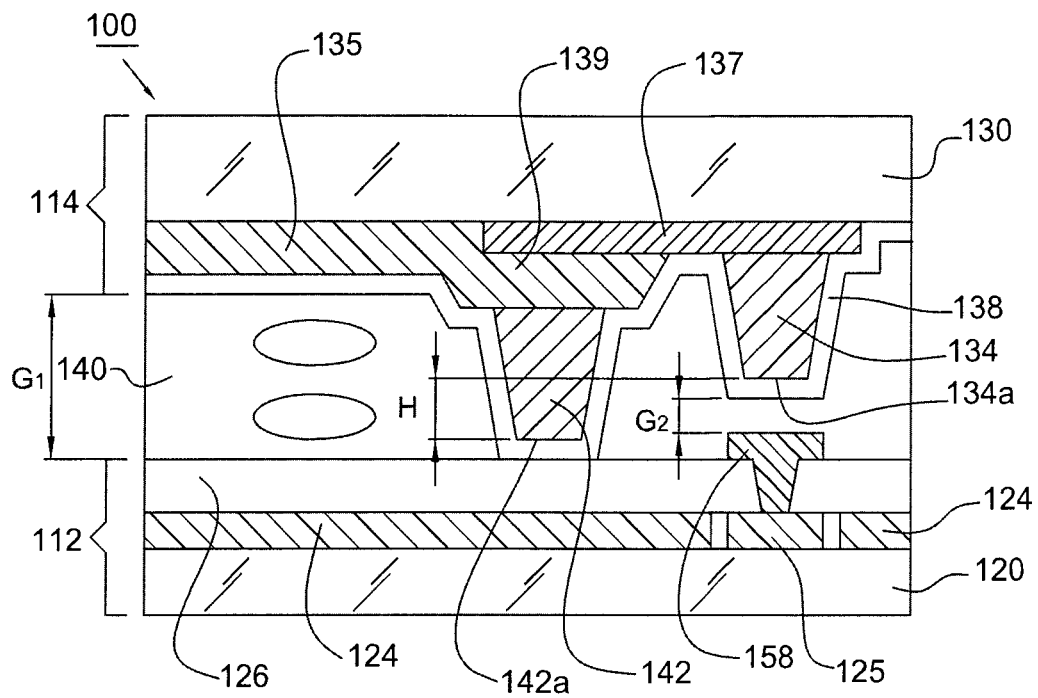
FIG. 3 is a cross-sectional view of a touch-sensitive LCD panel according to an embodiment of the present invention.

Referring to FIG. 3, it depicts a touch-sensitive liquid crystal display (LCD) panel 100, e.g. an in-cell touch-sensitive panel. The touch-sensitive LCD panel 100 includes a thin film transistor (TFT) substrate 112, a color filter (CF) substrate 114 and a liquid crystal (LC) layer 140. The liquid crystal layer 140 is disposed between the TFT substrate 112 and the CF substrate 114. The TFT substrate 112 includes a transparent substrate 120, an electrode layer 124, a net-shaped readout circuit (e.g. a net-shaped metallic lines 125) and a first insulating layer 126. The electrode layer 124 is formed above the transparent substrate 120. The net-shaped metallic lines 125 are also formed above the transparent substrate 120. The first insulating layer 126 is adapted to cover the electrode layer 124 and the first insulating layer 126.

Figure 4:
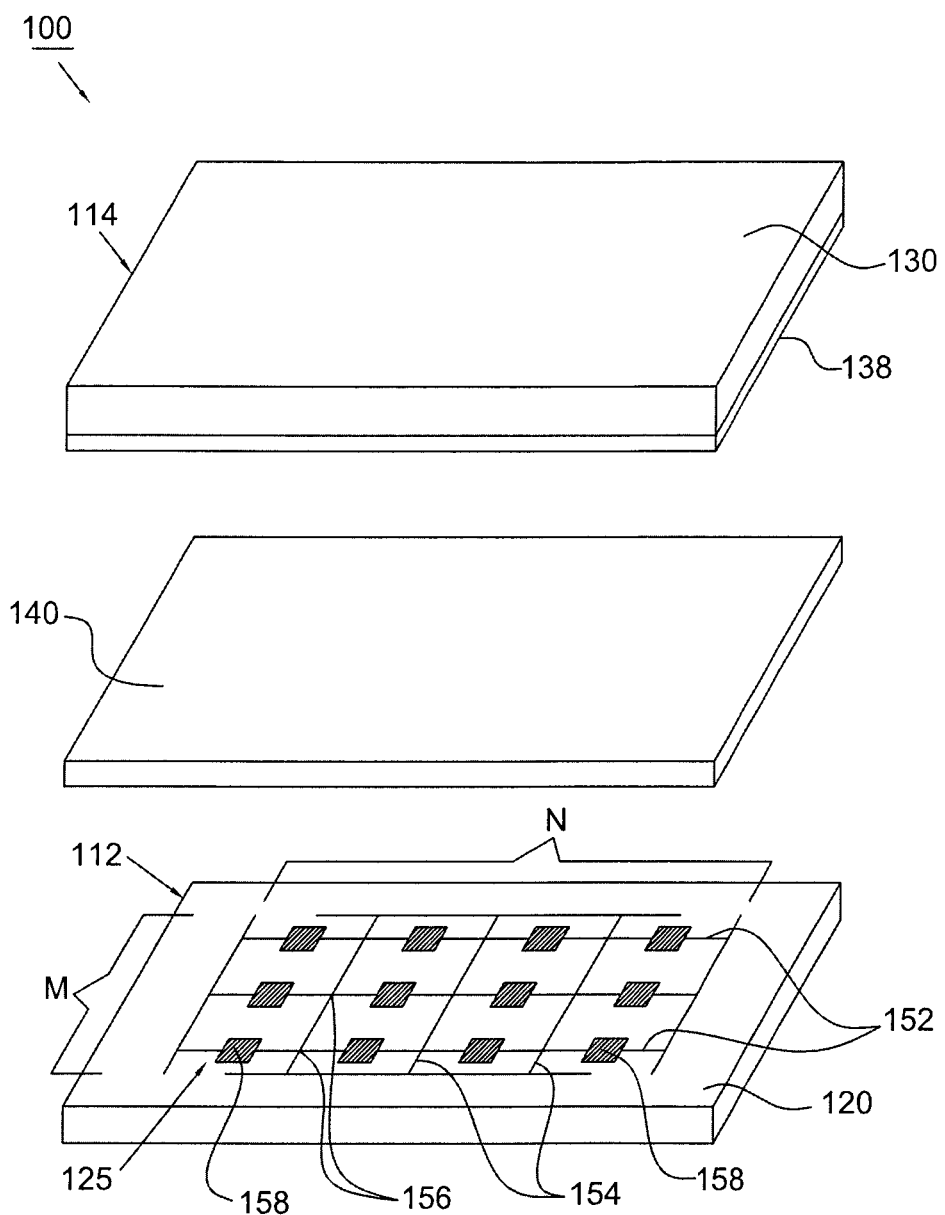
FIG. 4 is an exploded perspective view of the touch-sensitive LCD panel according to the embodiment of the present invention.

Referring to FIG. 4, the net-shaped metallic lines 125 includes M widthwise readout lines (e.g. widthwise metallic lines 152) and N lengthwise readout lines (e.g. lengthwise metallic lines 154), wherein M and N are integers and more than two. The widthwise metallic lines 152 are electrically connected to the lengthwise metallic lines 154. In this embodiment, the widthwise metallic lines 152 and the lengthwise metallic lines 154 can have M×N−4 connections 156 arranged in array manner. In other words, the widthwise metallic lines 152 and the lengthwise metallic lines 154 can have no connection arranged at corners of the net-shaped metallic lines 125. In another embodiment, the widthwise metallic lines 152 and the lengthwise metallic lines 154 can also have M×N connections 156 arranged in array manner. A plurality of conductive pads 158 arranged in array manner are electrically connected to the net-shaped metallic lines 125, and arranged to be adjacent to the connections 156.

Referring to FIG. 3 again, in this embodiment, the CF substrate 114 is opposite to the TFT substrate 112 and includes a transparent substrate 130, a plurality of black matrixes 137, a plurality of color filters 135, a plurality of spacers 142, a plurality of protrudent portions 134 and a transparent electrode 138. The black matrixes 137 are disposed on the transparent substrate 130. The color filters 135 are disposed on the transparent substrate 130 and the black matrixes 137, wherein the color filter 135 located on the black matrix 137 is formed to a protrusion 139. The spacers 142 are disposed on the protrusions 139 of the color filter 135 for keep the first pre-determined gap G1 between the TFT substrate 112 and the CF substrate 114. The protrudent portions 134 are disposed on the black matrixes 137, wherein there is a height difference H defined between top surfaces 142a of the spacers 142 and top surfaces 134a of the protrudent portions 134. The spacers 142 and the protrudent portions 134 can be made of same material by same manufacturing processes. The protrudent portions 134 are corresponding to the conductive pads 158, and there is the second gap G2 located between the protrudent portions 134 and the conductive pads 158. The protrudent portions 134 are made of nonconductive material. The transparent electrode 138 covers the transparent substrate 130, the black matrixes 137, the color filters 135, the spacers 142 and the protrudent portions 134. In addition, the arrangement density of the conductive pads 158 depends on design requirement, and further the arrangement density of the protrudent portions 134 are corresponding to that of the conductive pads 158. However, it is not necessary that the arrangement density of the spacers 142 is corresponding to that of the conductive pads 158. Thus, some of the spacers 142 are adjacent to the protrudent portions 134, and it is not necessary that the others of the spacers 142 are adjacent to the protrudent portions 134.

Figure 3A:
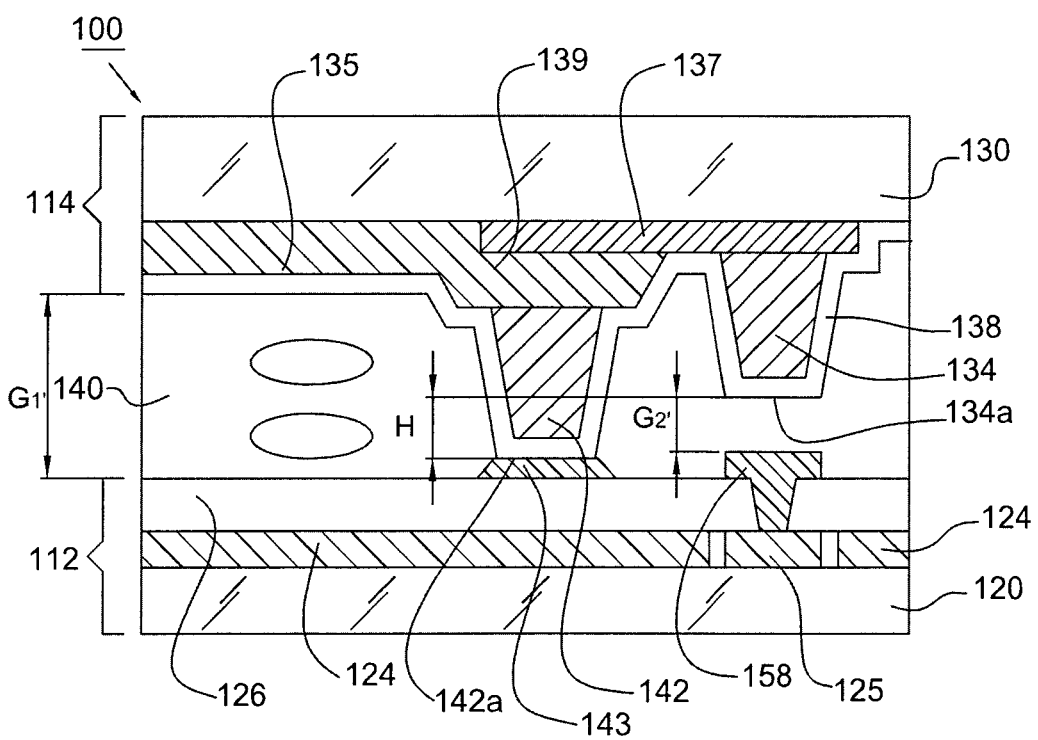
FIG. 3a is a cross-sectional view of a touch-sensitive LCD panel according to another embodiment of the present invention.

Referring to FIG. 3a, in another embodiment, the TFT substrate 112 further includes a pad layer 143, which is formed between the transparent substrate 120 and the spacers 142. The pad layer 143 is simultaneously formed during the manufacturing processes of scan lines and data lines. The pad layer 143 causes the spacers 142 to increase the gap between the TFT substrate 112 and the CF substrate 114 to be G1', and increases the gap between the protrudent portions 134 and the conductive pads 158 to be G2'. In other words, the gap between the protrudent portions 134 and the conductive pads 158 can be adjusted by the thickness of the pad layer 143 so as to fulfill the best touch-sensitive effect.

Figure 5:
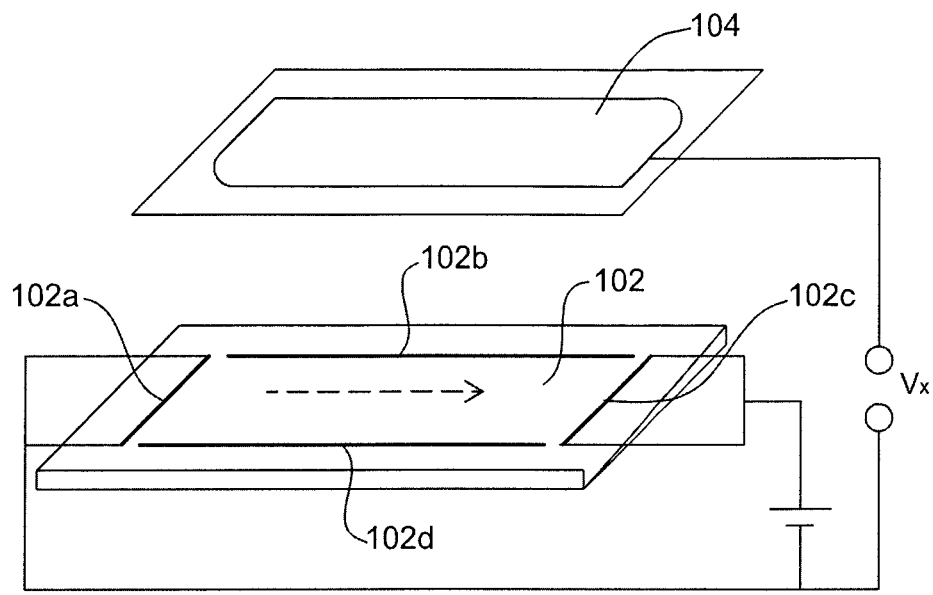
FIGS. 5 and 6 show that the voltage $V_x$ and $V_y$ of the touch-sensitive LCD panel are measured according to the embodiment of the present invention.
Figure 5:
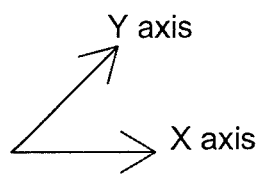
Figure 6:
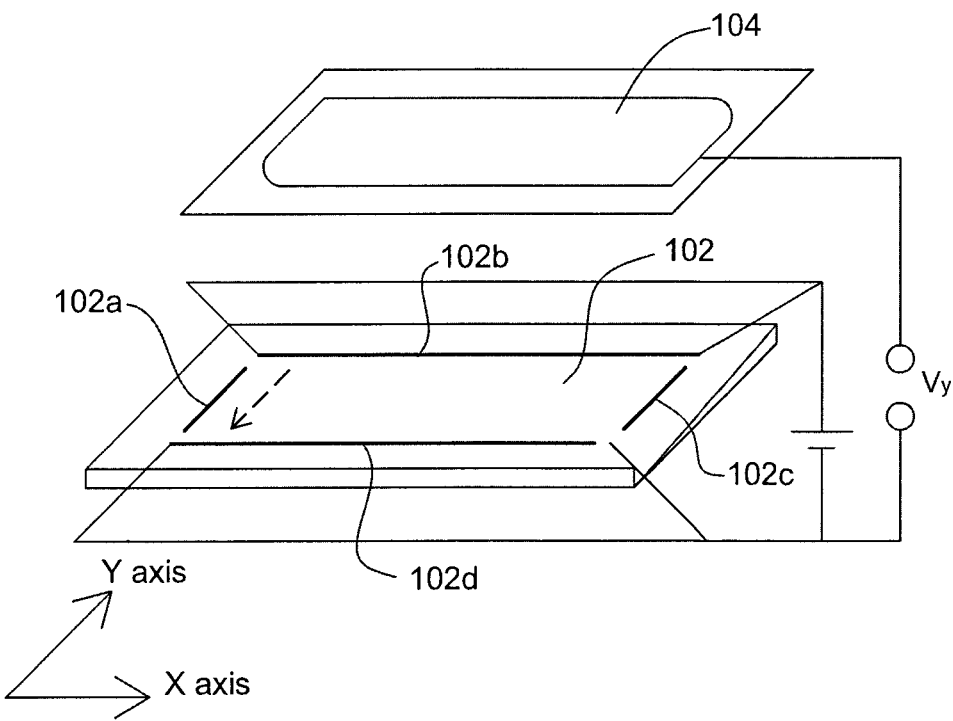
Figure 7:
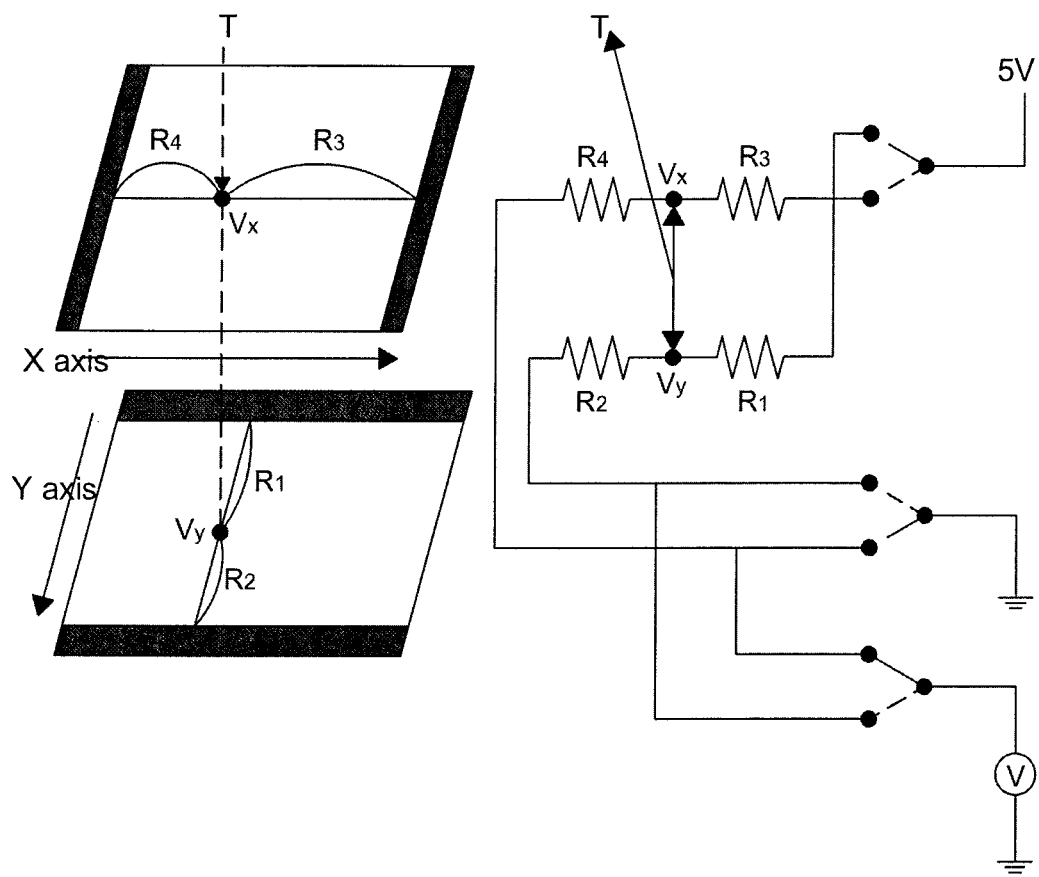
FIG. 7 shows that the voltage $V_x$ and $V_y$ of the touch-sensitive LCD panel are calculated according to the embodiment of the present invention.

Referring to FIGS. 5 and 6, in this embodiment, the transparent electrode 138 of the CF substrate 114 and the net-shaped metallic lines 125 of the TFT substrate 112 are considered as upper conductive layer 104 and lower conductive layer 102 of a resistance type touch-sensitive panel. The principle of the resistance type touch-sensitive panel is that the lower conductive layer 102 controls two conductive lines parallel to X axis and two conductive lines parallel to Y axis (i.e. four metallic lines 102a, 102b, 102c, 102d located around the lower conductive layer 102), and the upper conductive layer 104 responsibly transmits the voltage $V_x$ of X-axis and the voltage $V_y$ of Y-axis during touching. In this embodiment, the transparent electrode 138 is an uniform conductive layer, and thus the transparent electrode 138 can responsibly transmit the voltage when the transparent electrode 138 located on each of the protrudent portions 134 is contacted with the conductive pad 158 of the net-shaped metallic lines 125. Referring to FIG. 7, the touch position divides the lengthwise metallic lines into the first and second resistance lines (the first resistance line has the first resistance $R_1$, and the second resistance line has the second resistance $R_2$), and divides the widthwise metallic lines into the third and fourth resistance lines (the third resistance line has the first resistance $R_3$, and the fourth resistance line has the fourth resistance $R_4$). The voltages of divided resistance lines are proportional to resistance, and are shown in the following equations:

$$V_x = V \times R_3/(R_3+R_4)$$

$$V_y = V \times R_1/(R_1+R_2)$$

Wherein $V_x$ is the voltage of the third widthwise resistance line, $V_y$ is the voltage of the first lengthwise resistance line, and V is rated voltage (e.g. 5 volts). If the diameters of the resistance lines are the same, the voltages of divided resistance lines are proportional to the lengths of divided resistance lines, thereby calculating a coordinate of the touch position.

The relative circuit of the touch-sensitive functions is designed in the touch-sensitive LCD panel of the present invention. When the touch-sensitive LCD panel is manufactured, the circuit of the touch-sensitive function can be finished simultaneously. The touch-sensitive LCD panel of the present invention has no optical loss, but has touch-sensitive function. Furthermore, it is not necessary to extra add a conductive layer and a flat insulating layer so as not to increase manufacture cost and time. In addition, the spacers and the protrudent portions can be made by the same material and by the same manufacture processes so as not to also increase manufacture time.

Figure 8:
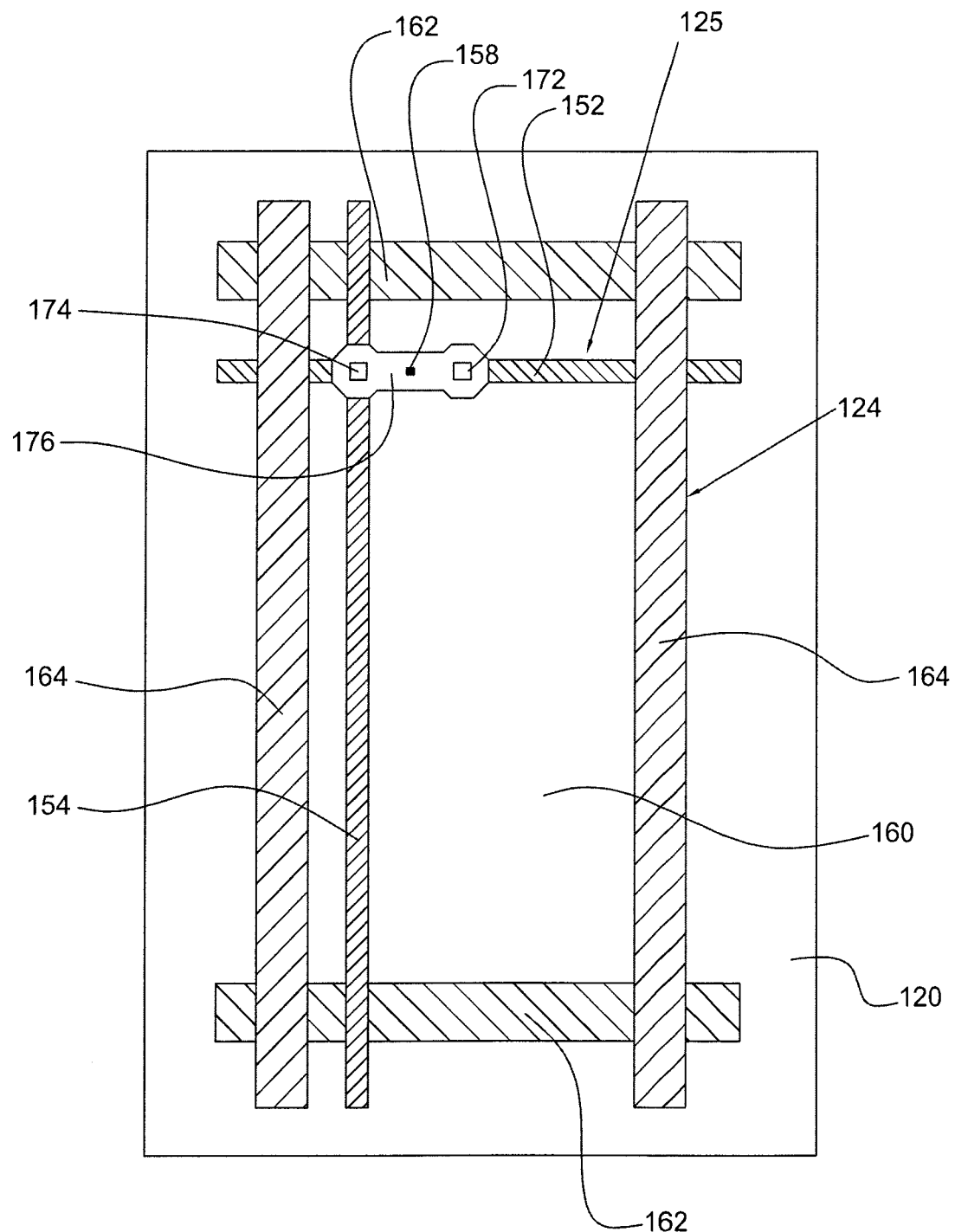
FIG. 8 is a partial plan view of a TFT substrate according to the embodiment of the present invention.
Figure 9:
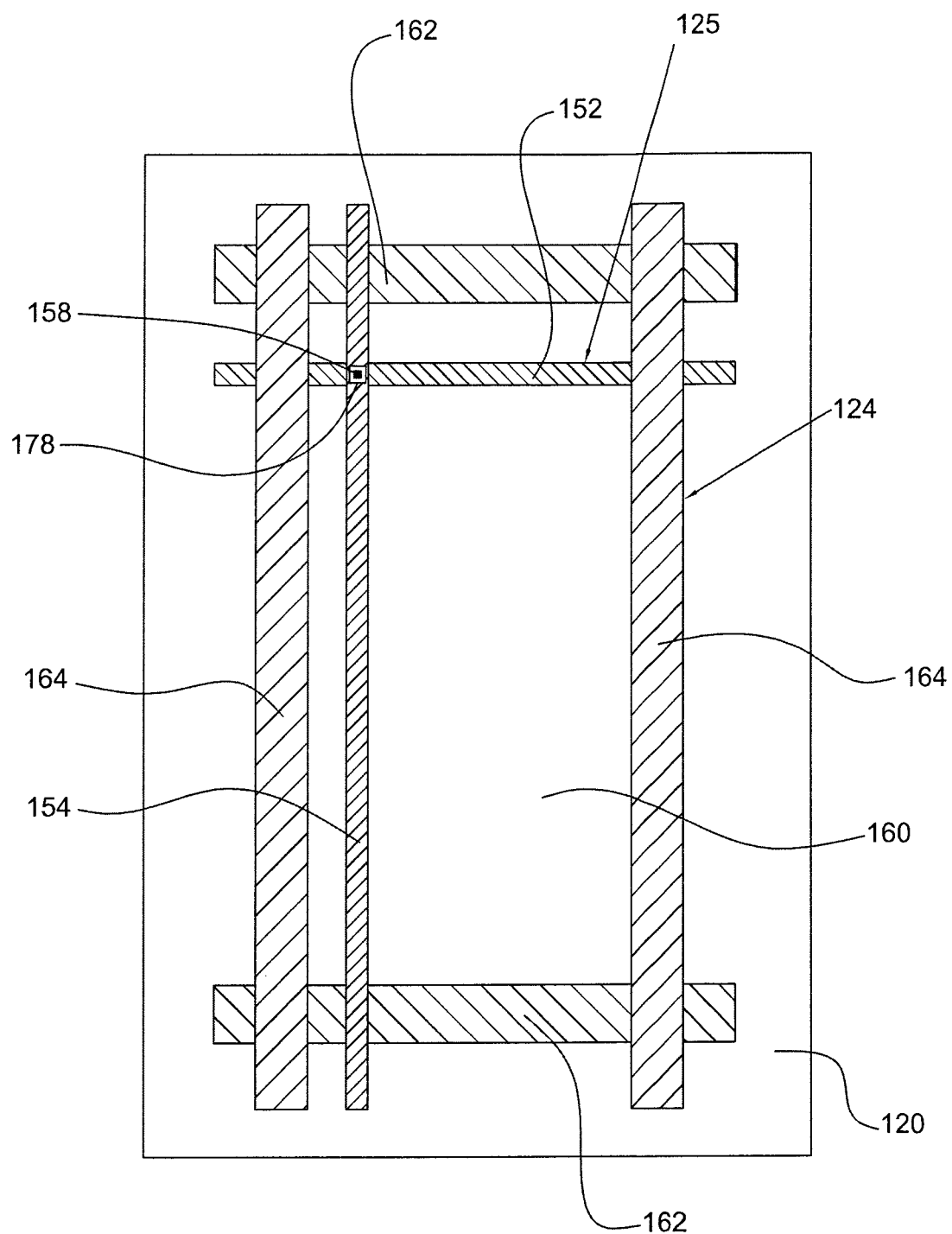
FIG. 9 is a partial plan view of a TFT substrate according to an alternative embodiment of the present invention.

Referring to FIG. 8, according the TFT substrate 112 in this embodiment, the electrode layer 124 can include a plurality of scan lines 162 and data lines 164, which are disposed above the transparent substrate 120. The scan and data lines 162, 164 cross each other, thereby defining a plurality of pixel regions 160. The widthwise metallic lines 152 are parallel to the scan lines 162, and the lengthwise metallic lines 154 are parallel to the data lines 164. The widthwise metallic lines 152 and the scan lines 162 are located the same level, and the lengthwise metallic lines 154 and the data lines 164 are located the same level. Those skilled in the art understand that a second insulating layer (not show) is disposed between the scan lines 162 and the data lines 164. Thus, the second insulating layer is also disposed between the widthwise metallic lines 152 and the lengthwise metallic lines 154. The conductive pads 158 are electrically connected to the net-shaped metallic lines 125 by forming a plurality of plated through holes (PTHs) 172, 174 in the first and second insulating layers and forming a plurality of metallic extension layers 176 on the first insulating layer. For example, each conductive pad 158 is electrically connected to the widthwise metallic line 152 by the metallic extension layer 176 and the PTH 172, and is electrically connected to the lengthwise metallic line 154 by the metallic extension layer 176 and the PTH 174. The metallic extension layers 176 can be made of transparent metal. Or, referring to FIG. 9, in an alternate embodiment, each conductive pad 158 is directly electrically connected to the widthwise metallic line 152 and the lengthwise metallic line 154. In addition, the arrangement density of the widthwise metallic line 152 and the lengthwise metallic line 154 depends on the requirement, e.g. one widthwise metallic line 152 and one lengthwise metallic line 154 per one, four or nine pixels 160 are arranged.

Figure 10:
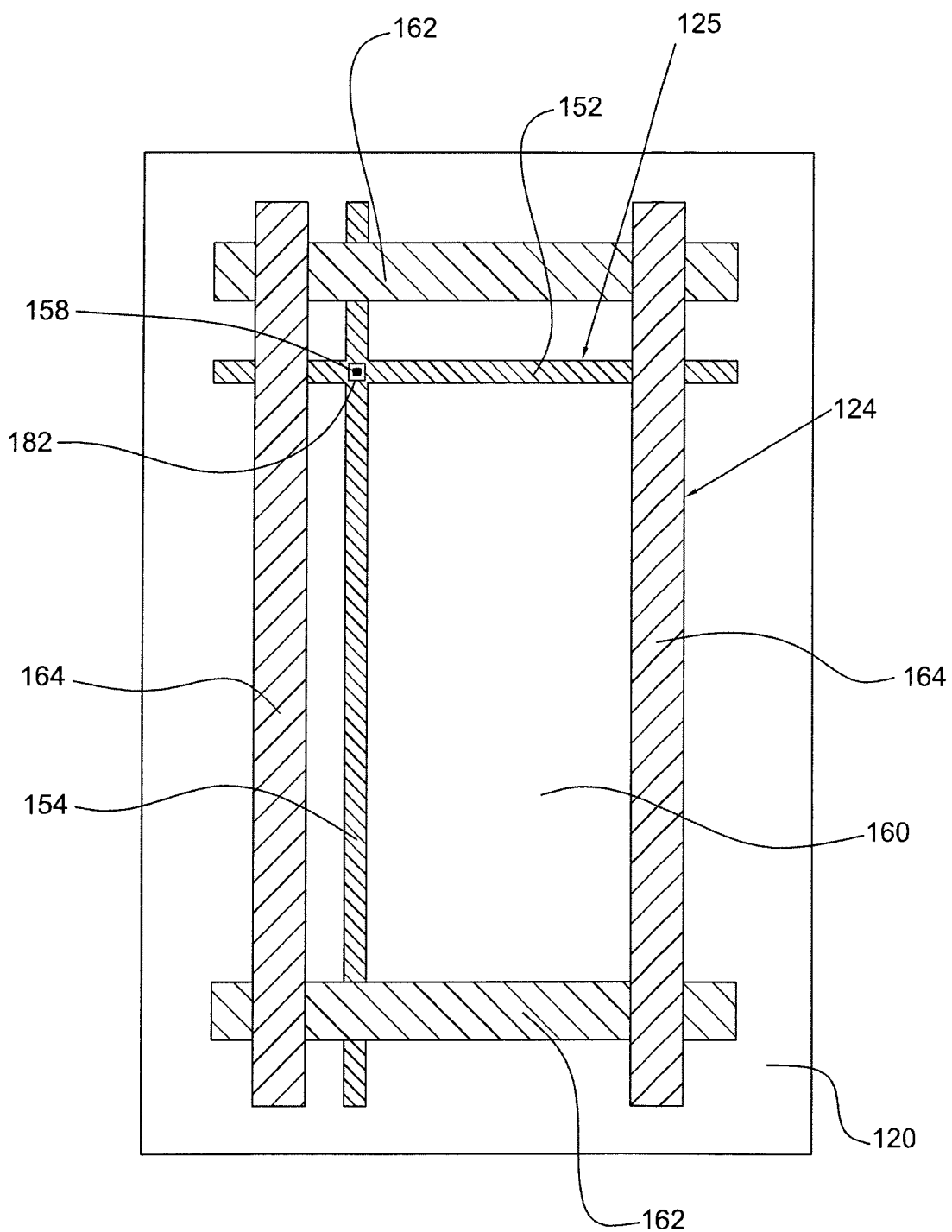
FIG. 10 is a partial plan view of a TFT substrate according to another embodiment of the present invention.

Referring to FIG. 10, according to the TFT substrate 112 in another embodiment, the electrode layer 124 can also include a plurality of scan lines 162 and data lines 164, which are disposed above the transparent substrate 120. The widthwise metallic lines 152 and the lengthwise metallic lines 154 are located above the scan lines 162. Those skilled in the art understand that a third insulating layer (not show) is disposed between the scan lines 162 and the data lines 164. The conductive pads 158 are electrically connected to the net-shaped metallic lines 125 by forming a plurality of plated through holes (PTHs) 182 in the third insulating layer. For example, each conductive pad 158 is directly electrically connected to a connection between the widthwise metallic line 152 and the lengthwise metallic line 154 by the single PTH 182.

Figure 11:
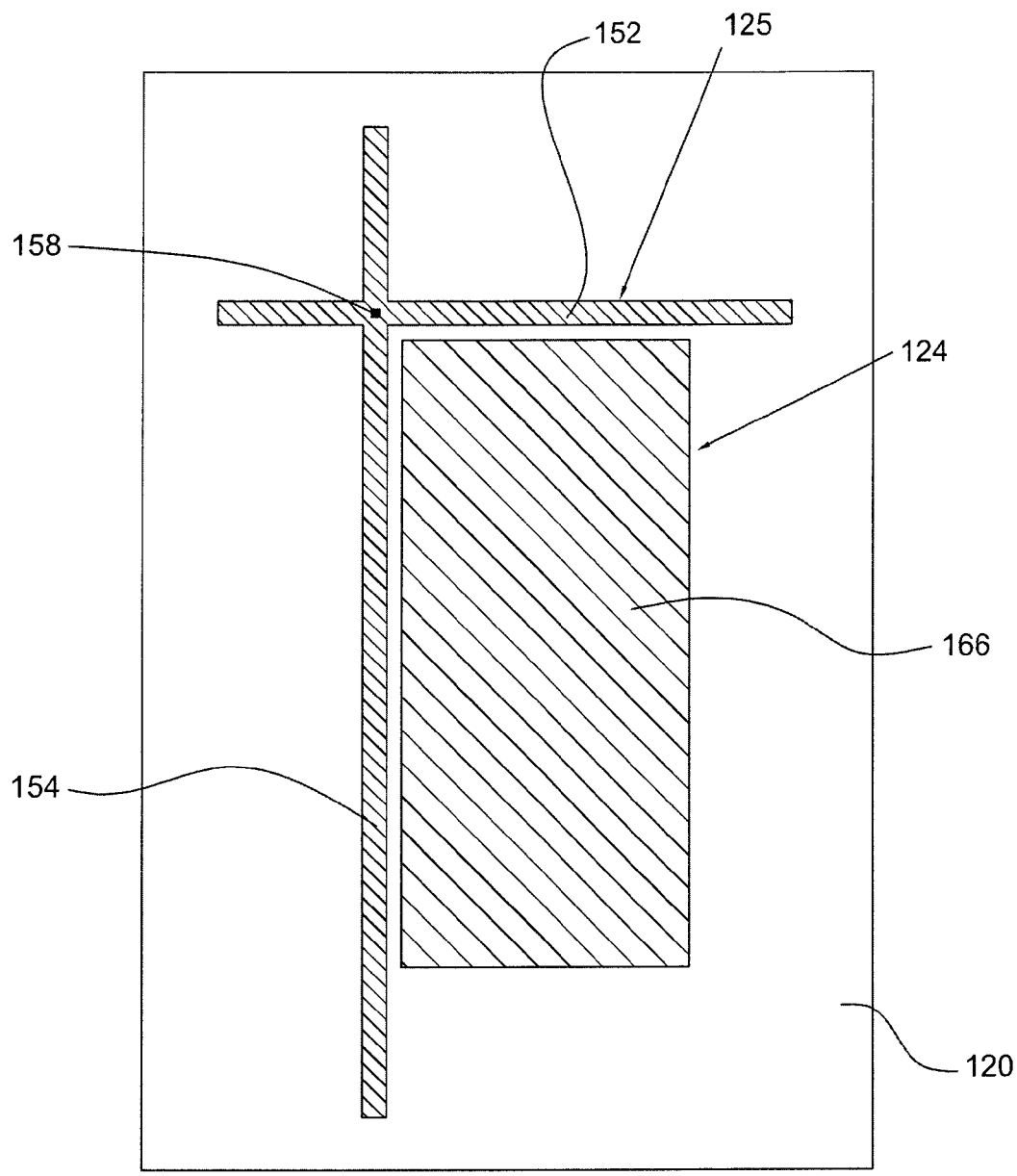
FIG. 11 is a partial plan view of a TFT substrate according to a further embodiment of the present invention.
Figure 12:
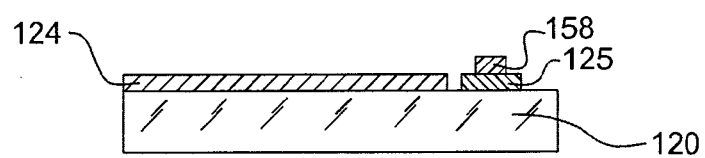
FIG. 12 is a partial cross-sectional view of a TFT substrate according to a further embodiment of the present invention.

Referring to FIG. 11, according to the TFT substrate 112 in a further embodiment, the electrode layer 124 can include a plurality of pixel electrodes 166, which are disposed above the transparent substrate 120. Referring to FIG. 12, the widthwise metallic lines 152 and the lengthwise metallic lines 154 are located on the same level, and are exposed from the first insulating layer. Thus, the conductive pads 158 can be directly electrically connected to the net-shaped metallic lines 125 without any PTH. For example, each conductive pad 158 is directly disposed at a connection between the widthwise metallic line 152 and the lengthwise metallic line 154.

Figure 13:
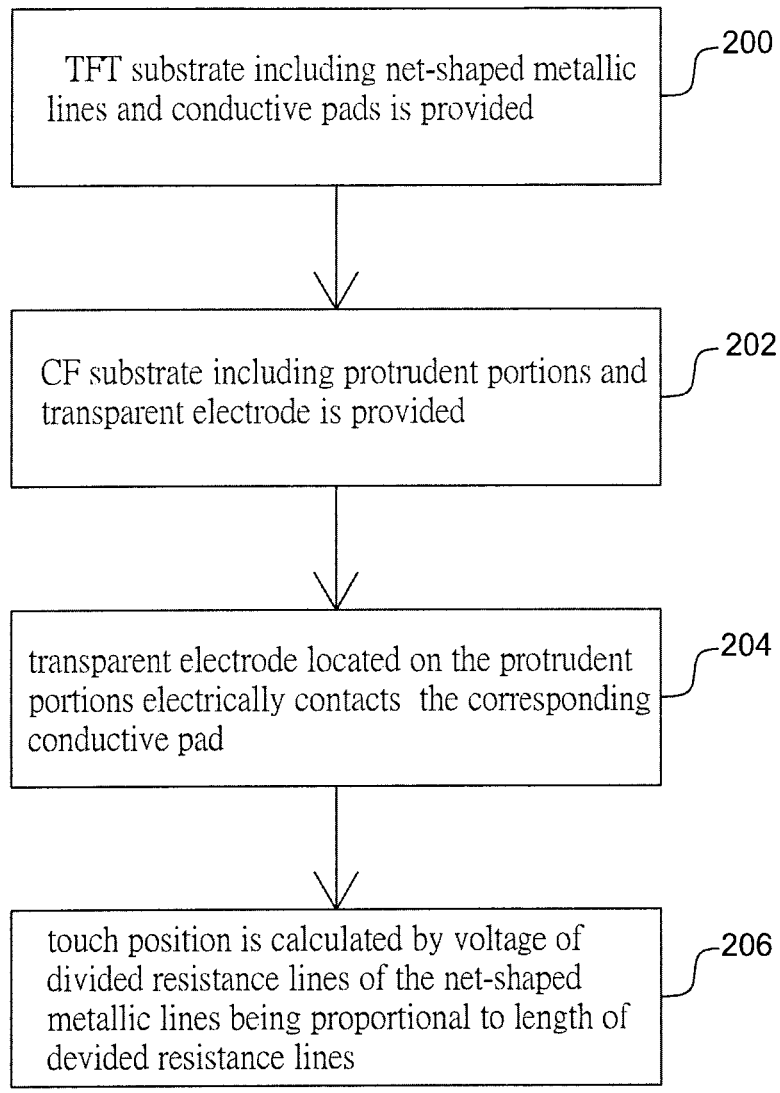
FIG. 13 is a flow diagram showing a method for calculating a coordinate of a touch position according to an embodiment of the present invention.

Referring to FIG. 13, it depicts a method for calculating a coordinate of a touch position of a touch-sensitive LCD panel according to an embodiment of the present invention. In step 200, a TFT substrate is provided, wherein the TFT substrate includes a net-shaped metallic lines and a plurality of conductive pads, and conductive pads are arranged in array manner. The net-shaped metallic lines include a plurality of widthwise metallic lines, lengthwise metallic lines and connections constituted by crosses of the widthwise metallic lines and the lengthwise metallic lines. The conductive pads are electrically connected to the net-shaped metallic lines. In step 202, a CF substrate is provided, and is opposite to the TFT substrate. The CF substrate includes a plurality of spacers, a plurality of protrudent portions and a transparent electrode, wherein the spacers are adapted to keep the first predetermined gap between the TFT substrate and the CF substrate, there is the second predetermined gap between each protrudent portion and the corresponding conductive pad, and the transparent electrode covers the spacers and the protrudent portions. In step 204, the transparent electrode located on the protrudent portion is electrically contacted with the corresponding conductive pad according to a touch position, wherein the touch position divides the widthwise metallic lines to the first and second widthwise resistance lines, and divides the lengthwise metallic lines into the first and second lengthwise resistance lines. In step 206, a coordinate of the touch position is calculated by voltages of the divided resistance lines (e.g. the first and second widthwise resistance lines and the first and second lengthwise resistance lines) of the net-shaped metallic lines being proportional to lengths of the divided resistance lines.

Figure 14:
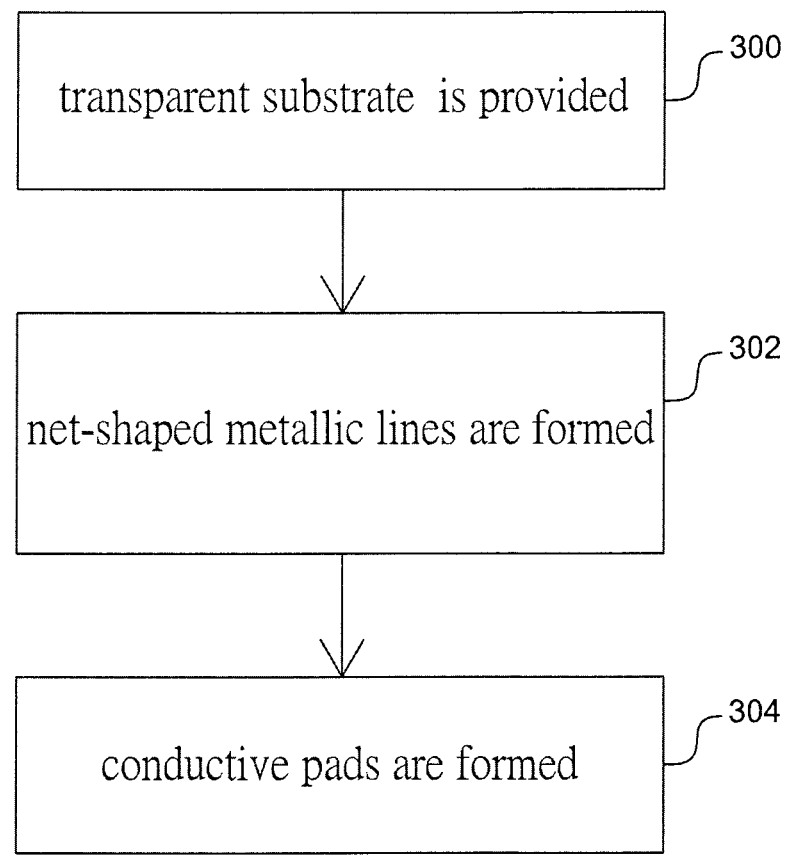
FIG. 14 is a flow diagram showing a method for manufacturing a TFT substrate according to an embodiment of the present invention.

Referring to FIG. 14, it depicts a method for manufacturing a TFT substrate according to an embodiment of the present invention. In step 300, a transparent substrate is provided. In step 302, net-shaped metallic lines are formed on the transparent substrate, wherein the net-shaped metallic lines include a plurality of widthwise metallic lines, lengthwise metallic lines and connections constituted by crosses of the widthwise metallic lines and the lengthwise metallic lines. In step 304, a plurality of conductive pads are formed, wherein the conductive pads are arranged in array manner and are electrically connected to the net-shaped metallic lines.

Referring to FIGS. 8 and 9 again, the method for manufacturing a TFT substrate in this embodiment of the present invention further includes the following step of: forming a plurality of scan lines 162 and data lines 164 on the transparent substrate 120, wherein the widthwise metallic lines 152 and the scan lines 162 are simultaneously formed by the same photolithography & etching processes, and the lengthwise metallic lines 154 and the data lines 164 are simultaneously formed by the same photolithography & etching processes.

Referring to FIG. 10 again, a method for manufacturing a TFT substrate in another embodiment of the present invention further includes the following step of: forming a plurality of scan lines 162 and data lines 164 on the transparent substrate 120, wherein formation steps of the widthwise metallic lines 152 and the lengthwise metallic lines 154 are earlier than a formation step of the scan lines 162.

Referring to FIG. 11, a method for manufacturing a TFT substrate in a further embodiment of the present invention further includes the following step of: forming a plurality of pixel electrode 166 on the transparent substrate 120, wherein the widthwise and lengthwise metallic lines 152, 154 and the pixel electrodes 166 are simultaneously formed by the same photolithography & etching processes.

Figure 15:
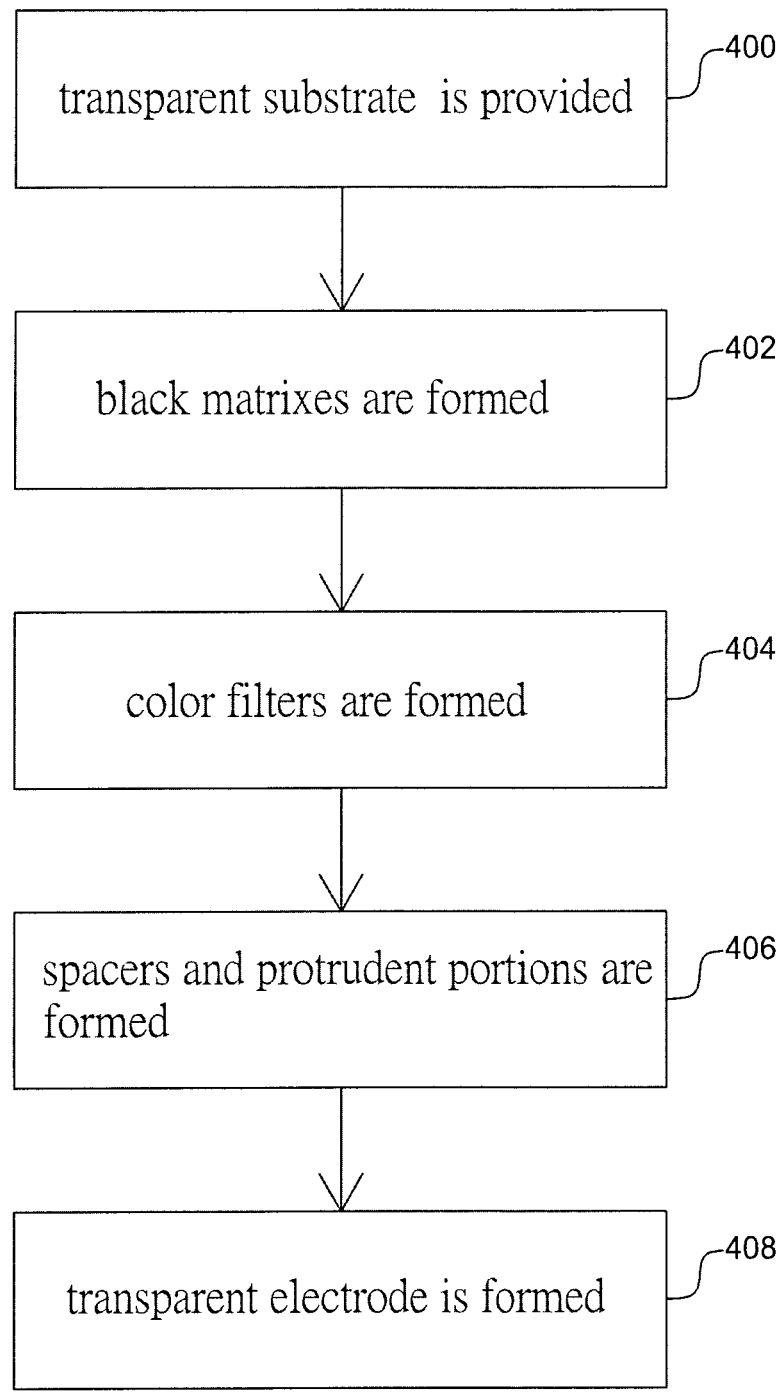
FIG. 15 is a flow diagram showing a method for manufacturing a CF substrate according to an embodiment of the present invention.

Referring to FIG. 15, it depicts a method for manufacturing a CF substrate according to an embodiment of the present invention. In step 400, a transparent substrate. In step 402, a plurality of black matrixes are formed on the transparent substrate. In step 404, a plurality of color filters are formed on the transparent substrate and the black matrixes, wherein the color filter located on the black is formed to a protrusion. In step 406, by the same formation step, a plurality of spacers are formed on the protrusions of the color filters, and a plurality of protrudent portions are simultaneously formed on the black matrixes. In step 408, a transparent electrode is formed for covering the transparent substrate, the black matrixes, the color filters, the spacer and the protrudent portions.

Although the invention has been explained in relation to its preferred embodiment, it is not used to limit the invention. It is to be understood that any other possible modifications and variations can be made by those skilled in the art without departing from the spirit and scope of the invention as hereinafter claimed.

What is claimed is:

1. An in-cell touch-sensitive panel comprising:
  a thin film transistor (TFT) substrate comprising:
    a net-shaped readout circuit comprising a plurality of widthwise and lengthwise readout lines, wherein the widthwise readout lines are electrically connected to the lengthwise readout lines; and
    a plurality of conductive pads arranged in array manner and electrically connected to the net-shaped readout circuit; and
  a color filter (CF) substrate opposite to the TFT substrate and comprising:
    a plurality of spacers adapted to keep a first gap between the TFT and CF substrates:
    a plurality of protrudent portions corresponding to the conductive pads, wherein there is a second gap between the protrudent portion and the conductive pad; and
    a transparent electrode adapted to cover the spacers and the protrudent portion.

2. The in-cell touch-sensitive panel as claimed in claim 1, wherein the net-shaped readout circuit further comprises a plurality of connections constituted by crosses of the widthwise and lengthwise readout lines, and the conductive pads are adjacent to the connections respectively.

3. The in-cell touch-sensitive panel as claimed in claim 2, wherein the net-shaped readout circuit is net-shaped readout metallic lines, and the widthwise readout line and the lengthwise readout line are metallic lines.

4. The in-cell touch-sensitive panel as claimed in claim 1, further comprising:
  a plurality of scan lines and data lines, wherein the widthwise readout lines are parallel to the scan lines, and the lengthwise readout lines are parallel to the data lines.

5. The in-cell touch-sensitive panel as claimed in claim 4, wherein the widthwise readout lines and the scan lines are located the same level, and the lengthwise readout lines and the data lines are located the same level.

6. The in-cell touch-sensitive panel as claimed in claim 5, further comprising:
  a plurality of plated through holes adapted to electrically connected the conductive pads to the net-shaped readout circuit.

7. The in-cell touch-sensitive panel as claimed in claim 6, further comprising:
  a plurality of metallic extension layers adapted to be electrically connected to the plated through holes.

8. The in-cell touch-sensitive panel as claimed in claim 7, wherein the metallic extension layers are made of transparent metal.

9. The in-cell touch-sensitive panel as claimed in claim 4, further comprising:
  a first transparent substrate, wherein the widthwise and lengthwise readout lines are located between the scan lines and the first transparent substrate.

10. The in-cell touch-sensitive panel as claimed in claim 9, further comprising:
  a plurality of plated through holes adapted to electrically connected the conductive pads to the net-shaped readout circuit.

11. The in-cell touch-sensitive panel as claimed in claim 9, wherein the TFT substrate further comprises a pad layer, which is formed between the first transparent substrate and the spacers.

12. The in-cell touch-sensitive panel as claimed in claim 1, further comprising:
  a plurality of pixel electrodes, wherein the widthwise readout lines and the lengthwise readout lines are located on the same level.

13. The in-cell touch-sensitive panel as claimed in claim 12, wherein the conductive pads are directly electrically connected to the net-shaped readout circuit.

14. The in-cell touch-sensitive panel as claimed in claim 13, wherein conductive pads are directly disposed at connections between the widthwise readout lines and the lengthwise readout lines.

15. The in-cell touch-sensitive panel as claimed in claim 1, wherein the CF substrate further comprises:
  a second transparent substrate;
  a plurality of black matrixes disposed on the second transparent substrate; and
  a plurality of color filters disposed on the second transparent substrate and the black matrixes, wherein the color filter located on the black matrix is formed to a protrusion;
  wherein:
    the spacers are disposed on the protrusions of the color filter,
    the protrudent portions are disposed on the black matrixes, and
    the transparent electrode also covers the second transparent substrate, the black matrixes and the color filters.

16. The in-cell touch-sensitive panel as claimed in claim 15, wherein the spacers and the protrudent portions are made by the same material.

17. The in-cell touch-sensitive panel as claimed in claim 16, wherein the protrudent portions are made of nonconductive material.

18. The in-cell touch-sensitive panel as claimed in claim 15, wherein there is a height difference defined between top surfaces of the spacers and top surfaces of the protrudent portions.

19. A method for calculating a coordinate of a touch position of an in-cell touch-sensitive panel comprising the following steps of:

provid ing a TFT substrate, wherein the TFT substrate comprises a net-shaped readout circuit and a plurality of conductive pads arranged in array manner, the net-shaped readout circuit comprises a plurality of widthwise readout lines, lengthwise readout lines and connections constituted by crosses of the widthwise readout lines and the lengthwise readout lines, and the conductive pads are electrically connected to the net-shaped readout circuit;

providing a CF substrate, wherein the CF substrate is opposite to the TFT substrate, the CF substrate comprises a plurality of spacers, a plurality of protrudent portions and a transparent electrode, the spacers are adapted to keep the first predetermined gap between the TFT substrate and the CF substrate, there is the second predetermined gap between each protrudent portion and the corresponding conductive pad, and the transparent electrode covers the spacers and the protrudent portions;

electrically contacting the transparent electrode located on the protrudent portion with the corresponding conductive pad according to a touch position, wherein the touch position divides the widthwise readout lines into the first and second widthwise resistance lines, and divides the lengthwise readout lines into the first and second lengthwise resistance lines; and calculating a coordinate of the touch position by voltages of the divided resistance lines being proportional to lengths of the divided resistance lines.

\* \* \* \* \*